(12) United States Patent
Izhar (10) Patent No.: US 11,693,590 B2
(45) Date of Patent: Jul. 4, 2023

(54) NON-VOLATILE MEMORY EXPRESS OVER FABRIC (NVME-OF™) SOLID-STATE DRIVE (SSD) ENCLOSURE PERFORMANCE OPTIMIZATION USING SSD CONTROLLER MEMORY BUFFER

(71) Applicant: DELL PRODUCTS L.P., Round Rock, TX (US)

(72) Inventor: Amnon Izhar, Newton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/533,410

(22) Filed: Nov. 23, 2021

(65) Prior Publication Data
US 2023/0161499 A1 May 25, 2023

(51) Int. Cl.
*G06F 3/06* (2006.01)

(52) U.S. Cl.
CPC ............ *G06F 3/0656* (2013.01); *G06F 3/067* (2013.01); *G06F 3/0613* (2013.01); *G06F 3/0659* (2013.01); *G06F 3/0679* (2013.01); *G06F 2212/214* (2013.01)

(58) Field of Classification Search
None
See application file for complete search history.

(56) References Cited

U.S. PATENT DOCUMENTS

2021/0247935 A1* 8/2021 Beygi ................. G06F 3/067

* cited by examiner

*Primary Examiner* — Brian R Peugh
(74) *Attorney, Agent, or Firm* — North Weber & Baugh LLP (57) ABSTRACT

Systems and methods provide alternative store-and-forward mechanisms to utilize a Non-Volatile Memory Express (NVMe™) drive's Controller Memory Buffer (CMB) instead of using a fabric bridge's memory resources to increase overall throughput. In various embodiment this successfully avoids performance scaling limitations of a centralized store-and-forward memory location for data input/output, within a large disk-array, that may otherwise oversubscribe the available memory space.

20 Claims, 10 Drawing Sheets

NON-VOLATILE MEMORY EXPRESS OVER FABRIC (NVME-OF™) SOLID-STATE DRIVE (SSD) ENCLOSURE PERFORMANCE OPTIMIZATION USING SSD CONTROLLER MEMORY BUFFER

BACKGROUND

A. Technical Field

The present disclosure relates generally to storage networking. More particularly, the present disclosure relates to using Controller Memory Buffers (CMBs) in storage applications to enhance Non-Volatile Memory Express Over Fabric (NVMe-oF™) Solid-State Drive (SSD) enclosure performance.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The usage of NVMe-oF™-to-NVMe™ bridge devices in an NVMe-oF™ JBOF (Just a Bunch Of Flash) enclosure presents challenges in design tradeoffs for the memory subsystem of the bridge device. The NVMe-oF™ bridge device has to use its memory subsystem as the central store-and-forward location in the JBOF enclosure for NVMe™ read/write operations for data buffers. Further, the memory subsystem needs to scale in order to meet variable workloads.

Accordingly, it is highly desirable to find ways to avoid oversubscription of a bridge device's memory subsystem that can become congested during operation and degrade overall performance of the JBOF enclosure.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The words "optimal," "optimize," "optimization," and the like refer to an improvement of an outcome or a process and do not require that the specified outcome or process has achieved an "optimal" or peak state.

Any headings used herein are for organizational purposes only and shall not be used to limit the scope of the description or the claims. Each reference/document mentioned in this patent document is incorporated by reference herein in its entirety.

It is noted that any experiments and results provided herein are provided by way of illustration and were performed under specific conditions using a specific embodiment or embodiments; accordingly, neither these experiments nor their results shall be used to limit the scope of the disclosure of the current patent document.

It is also noted that although embodiments described herein may be within the context of NVMe-oF™ bridges, aspects of the present disclosure are not so limited. Accordingly, the aspects of the present disclosure may be applied or adapted for use in other contexts and computing environments.

In this document, the terms "CMB," "memory," and "CMBs" are used interchangeably. Similarly, the terms "drive enclosure," "NVMe-oF™ JBOF enclosure," "JBOF enclosure," and "storage enclosure are used interchangeably.

A. General Overview

Ever-increasing data generation, consumption, and storage demands coupled with increasing network speeds, have led to a large increase in the popularity of SSDs and flash memory devices that can provide much faster storage solutions when compared to hard drives. Non-Volatile Memory express (NVMe™) is a device interface protocol for accessing SSD over PCI express (PCIe) developed specifically for optimizing host access to non-volatile memory. NVMe™ has become the de facto protocol for all PCIe connected SSDs as it allows to efficiently access SSDs with low latency, highly parallelism, and minimal host overhead. NVMe™ was first mapped over the PCIe protocol, and as such, NVMe™ based SSDs were mostly limited to a connection of single or few SSDs within a host or server. NVMe-oF™, which was developed as an extension of NVMe™, is a network protocol that allows one or multiple hosts to connect to one or multiple storage systems over a network (fabric). A major objective of NVMe-oF™ is to extend the scale and reach of NVMe™ beyond the typical limits of the PCIe bus. The combination of NVMe™ SSDs and NVMe-oF™ technologies have made it possible and desirable to build shared storage appliances, such as NVMe-oF™ JBOF enclosures. The main benefit of such enclosures is that they allow sharing of storage capacity across multiple hosts, thereby, increasing storage utilization.

Figure 1:
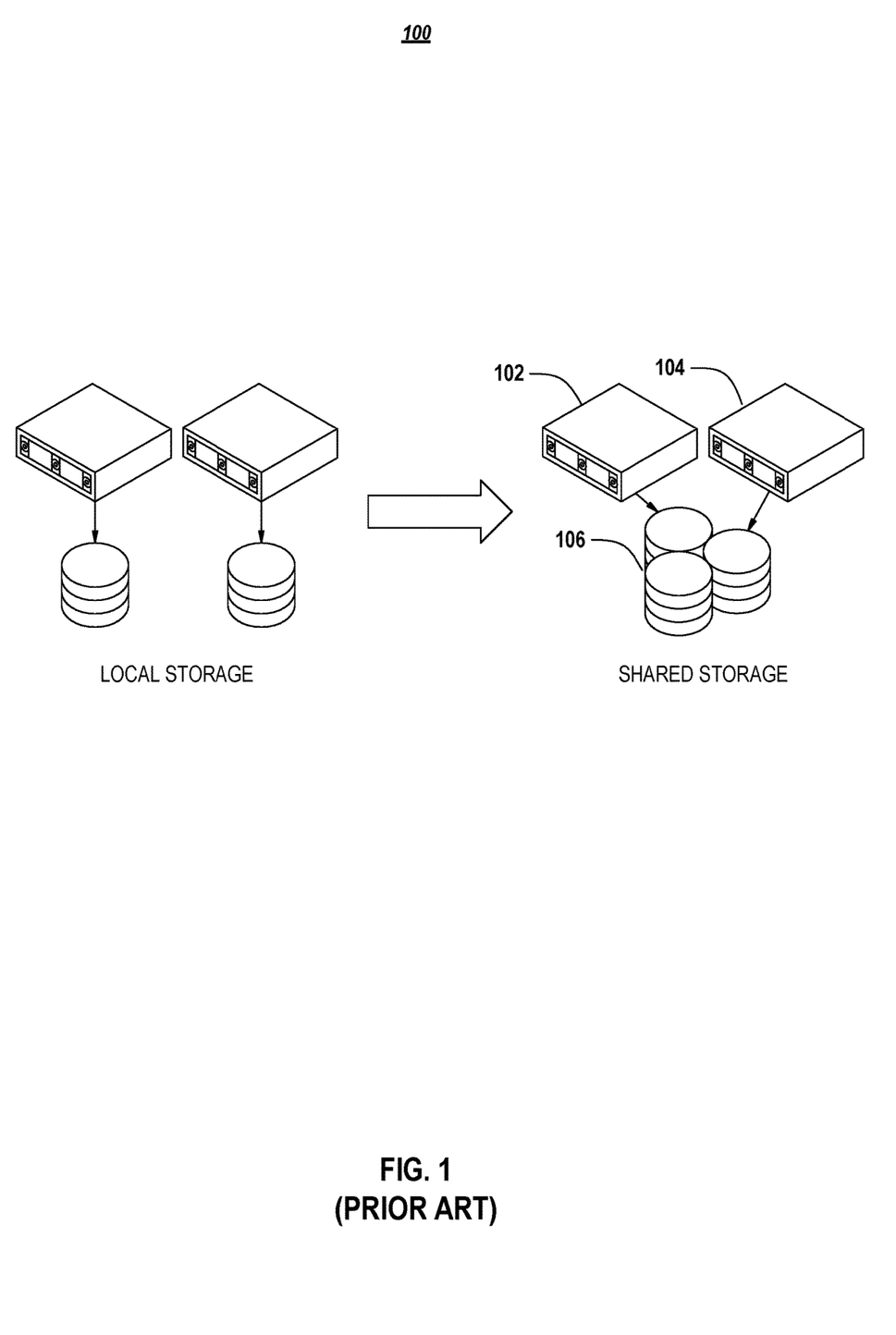
FIG. 1 ("FIG. 1") depicts storage disaggregation in an NVMe-oF™ system.

As depicted in FIG. 1, in an NVMe-oF™ system, such as system 100, remote hosts 102, 104 submit read and write commands to shared storage enclosure 106. Enclosure 106 comprises a computing element that serves as an NVMe-oF™-to-local NVMe™ bridge, i.e., the bridge receives the read/write command and communicates a read/write command to the appropriate SSDs in enclosure 106. Data transfer involves remote hosts 102 and 104 transferring data to and from a local bridge memory (not shown). The SSDs, in turn, use direct memory access (DMA) to read/write data payload to/from the bridge memory to the SSD persistent media. Data transfers use the bridge memory resources as a store-and-forward buffer.

Bridge device design for storage enclosure 106 faces several challenging requirements, such as having to supply high-bandwidth access to storage enclosure 106 with minimal added latency from remote host 102, 104 and supplying high-bandwidth and low-latency memory resources, while maintaining low cost, space, and power consumption to minimize the resources required to reliably operate storage enclosure 106.

Accordingly, it would be desirable to have systems and methods that overcome existing challenges in the design of enclosures and bridge devices and maintain scalable performance of the bridge bandwidth/latency with variable workloads.

B. Problem Statement

Figure 2:
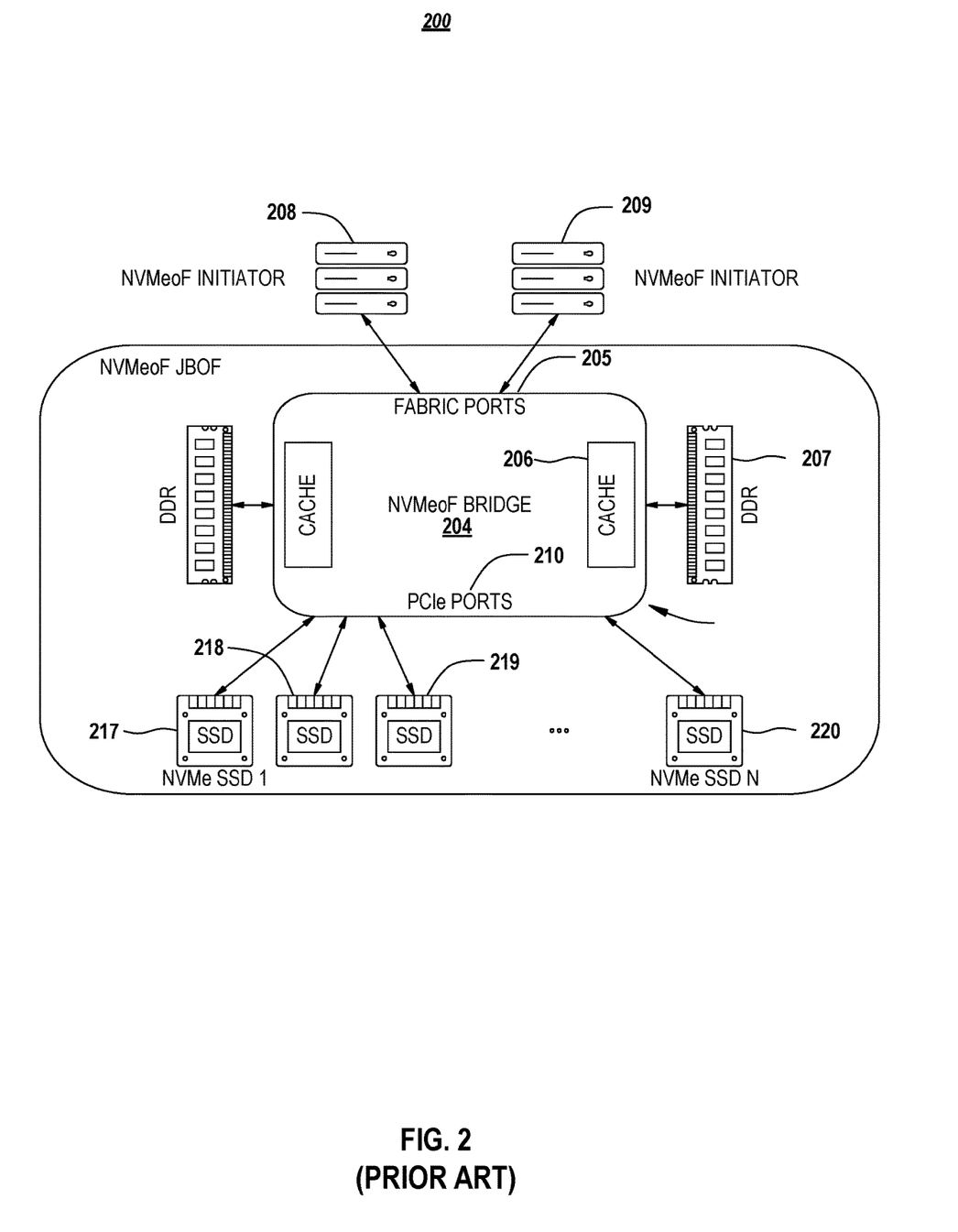
FIG. 2 is a basic block diagram depicting the major components of a typical NVMe-oF™ JBOF enclosure.

The increase in popularity of SSDs and the rise in networking speeds, drove the development of the NVMe-oF™ standard that allows disaggregation of servers from storage. An NVMe-oF™ JBOF enclosure allows one or multiple servers to extend storage capacity beyond their local capacity and create a pool of storage that can be shared across servers. FIG. 2 is a basic block diagram depicting the main components of a typical NVMe-oF™ JBOF enclosure. The central portion of storage enclosure 202 is NVMe-oF™ bridge device 204. Bridge device 204 comprises cache 206, DDR 207, fabric ports 205, and PCIe ports 210.

In operation, NVMe-oF™ bridge device 204 receives NVMe-oF™ capsules from remote initiators 208, 209, terminates the NVMe-oF™ capsules, and forwards these as NVMe™ commands to SSD devices (e.g., 220) that are connected to the PCIe ports 210 of bridge 204. When deploying an NVMe™ JBOF solution, it is typical to deploy multiple SSDs in enclosure 202 such as to aggregate bandwidth capability to support the storage needs of multiple servers, here, NVMe-oF™ initiators 208, 209, while scaling memory capacity. It is common for storage enclosure 202 to be oversubscribed, i.e., the maximum bandwidth of fabric ports 205 is lower than the maximum bandwidth of all the underlying SSDs (e.g., 220):

Fabric Bandwidth $< \sum_{i=1}^{N}$ Bandwidth of SSD(i), where N represents the maximum number of SSDs in the enclosure.

Oversubscription is common since it is unlikely that enclosure 202 needs to supply full bandwidth for all SSDs 217-220 concurrently and for sustained periods of time. One of the main NVMe-oF™ design challenges relates to the bandwidth requirements for the bridge memory sub-system. Given the store-and-forward architectural limitations, existing designs require using the NVMe-oF™ bridge memory controller (not shown) to allocate temporary buffers for data written to memory. For NVMe™ write commands, data is written from fabric port 205 to the bridge memory, and for NVMe™ read commands, data is written from the SSD controller (not shown in FIG. 2) to the bridge memory. The same memory buffer is read at the next data movement stage, which allows the memory buffer to be made available again for the subsequent data transfer. In this worst-case mode of operation, the steady-state memory bandwidth needs to be twice as high as the bandwidth of fabric port(s) 205. The full store-and-forward behavior of existing designs can thus lead to a memory bandwidth bottleneck at NVMe-oF™ bridge 204.

Therefore, it is desirable to overcome the challenges of using a central NVMe-oF™ bridge device 204 in a JBOF configuration to avoid the bridge device memory system becoming congested and causing a degradation in the overall performance of shared storage enclosure 202.

Variables in a JBOF ecosystem comprise the number of active SSDs, I/O size, a mix of read/write operations, and different SSD types with different performance capabilities. CMB is an optional NVMe™ SSD feature that, as discussed in greater detail below, is utilized in various embodiments herein to benefit shared storage enclosure capabilities. In one or more embodiments, this is accomplished by modifying the I/O data flow between bridge 204 device and SSDs 217-220 in enclosure 202 to benefit the overall enclosure performance characteristics. In one or more embodiments, NVMe™ SSD CMB capability is utilized as a store-and-forward buffer location to avoid oversubscription of the centralized memory subsystem of bridge device 204 to avoid the bridge memory becoming a point of congestion. Advantageously, this improves overall network performance. In one or more embodiments, increasing the number of drives 217-220 provides additional memory element, further enhancing system performance.

Figure 3:
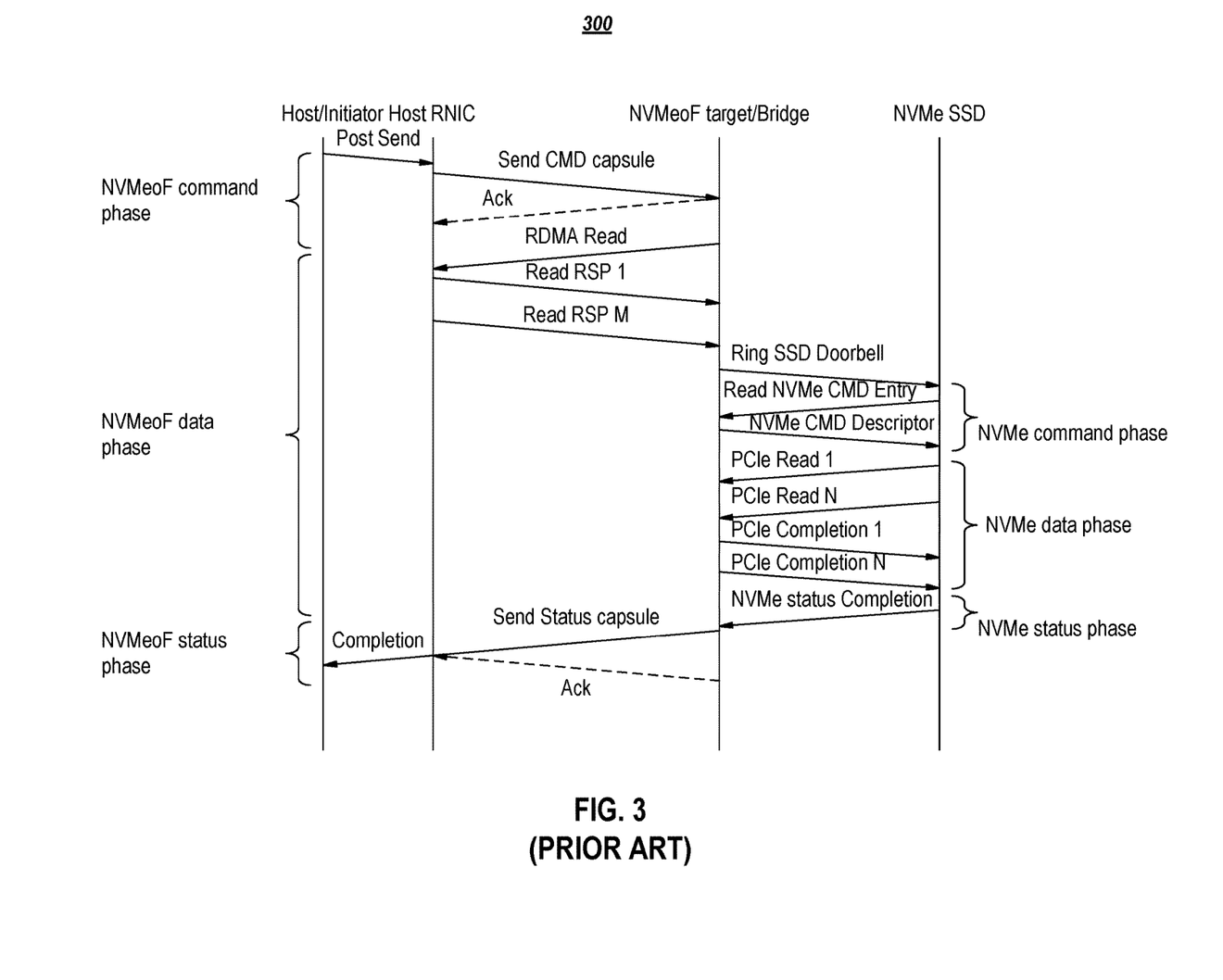
FIG. 3 depicts a sample NVMe™-oF™ write exchange.

FIG. 3 is a bounce diagram for an NVMe-oF™ write command from a remote host to an NVMe™ SSD using, e.g., remote direct memory access (RDMA) for the protocol between a host and a JBOF bridge device. Each I/O command in FIG. 3 is broken into three main phases: the command phase, data phase, and status phase. As shown in diagram 300, for the write command, the NVMe-oF™ bridge decodes the command and initiates an RDMA read for the data phase. At this stage, the data payload is forwarded from an initiator memory to the bridge local memory. Once the payload is transferred to the bridge's local memory, the bridge may start the NVMe™ command phase to the SSD. This allows the SSD controller to transition into the NVMe™ data phase, master a DMA data fetch from the bridge's local memory into the SSD and then write the data to the SSD media. Once the SSD controller completes fetching the payload, it starts writing a completion entry to the bridge's local memory. Then the bridge sends, e.g., by using a successful status or error message, a completion entry to the initiator, thus, signaling that the write command is complete.

Figure 4:
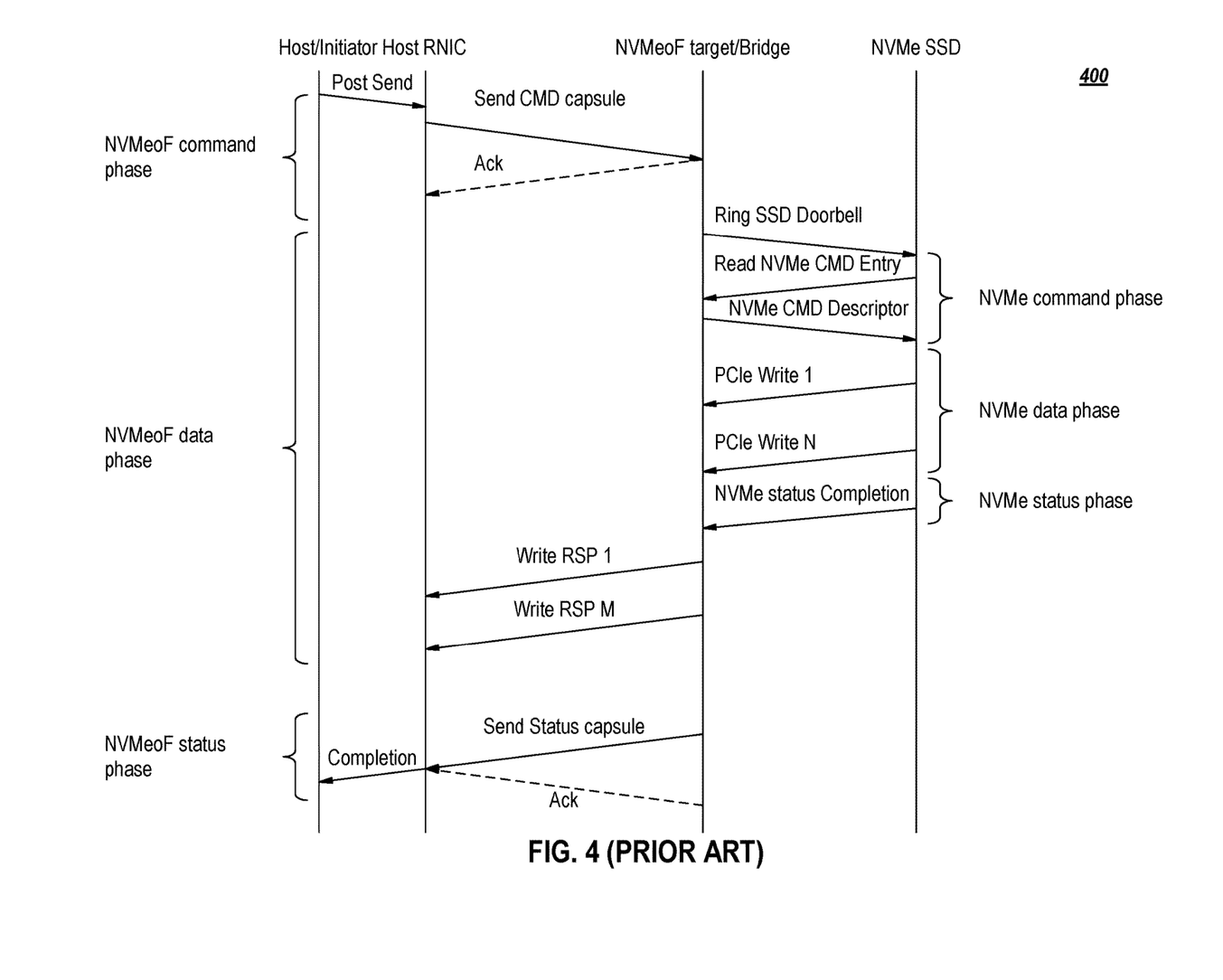
FIG. 4 depicts a sample NVMe-oF™ read exchange.

FIG. 4 is a bounce diagram for an NVMe-oF™ read command from a remote host to an NVMe™ SSD using RDMA for the protocol between the host and the JBOF bridge device. For an NVMe-oF™ read command, the direction of the data phase reverses; however, the same concept as for the write command applies. The bridge device terminates the read capsule from the host and proceeds with issuing the read command to the SSD controller. The SSD controller DMAs the data payload and writes the data payload to the bridge's memory. Once the data phase is complete, the SSD controller communicates a completion message, allowing the bridge device to RDMA the data from bridge memory to the initiator memory space. The data I/O operation completes when the bridge device writes the completion status capsule to the initiator.

It is noted that the full buffering of the data I/O into bridge memory is required. In the NVMe™ protocol, once the SSD host (here, the NVMe-oF™ bridge device) sends a command to the SSD controller, the SSD has full ownership of the memory buffers that were sent to the SSD controller during the command phase. The SSD controller may fetch the data payload, e.g., in any order, from the host memory buffer locations where that data resides.

As an example, a typical NVMe-oF™ bridge may include a 100 GbE Ethernet port on the fabric side and may need to support 24 NVMe™ SSDs on the NVMe™ port that, e.g., connect to the bridge using a PCIe fan-out switch. In such a configuration, the bridge's memory system may require an overall bandwidth limit of ~100 GbE*2 (fabric duplex)*2 (store-and-forward)≈400 Gb/s.

This high memory bandwidth requirement can be met with either using a large number of DDR channels or a more unique memory technology, such as high bandwidth memory (HBM). With a single DDR4 channel maximum effective bandwidth of ~15 GB/s, three memory channels are required to match the fabric BW. This high bandwidth memory requirement leads to increased cost, power, and physical packaging size for the NVMe-oF™ bridge device and increases the overall cost of the storage enclosure.

Returning now to FIG. 2, in order to overcome the bandwidth limitation of DDR4 memory 207, one possible solution is to use the internal cache memory 206, which may be leveraged to achieve higher bandwidth and lower access latency. With this caching approach, cache memory 206 of bridge 204 may be utilized to hold store-and-forward buffers for NVMe™ data transfers. Given the nature of the data transfer previously described, it is expected that every data payload that is written to memory will be followed by a read operation such that, once the data is read, the cache entry can be marked available again for subsequent use.

The main challenge with this approach is that NVMe™ is optimized to be highly parallel across I/O streams. The performance of an individual SSD (e.g., 220) increases as the number of concurrent I/Os submitted to the SSD is increased. This increase can result in cache 206 becoming heavily overburdened as the amount of active data being transferred between the SSD and the remote host increases.

Figure 5:
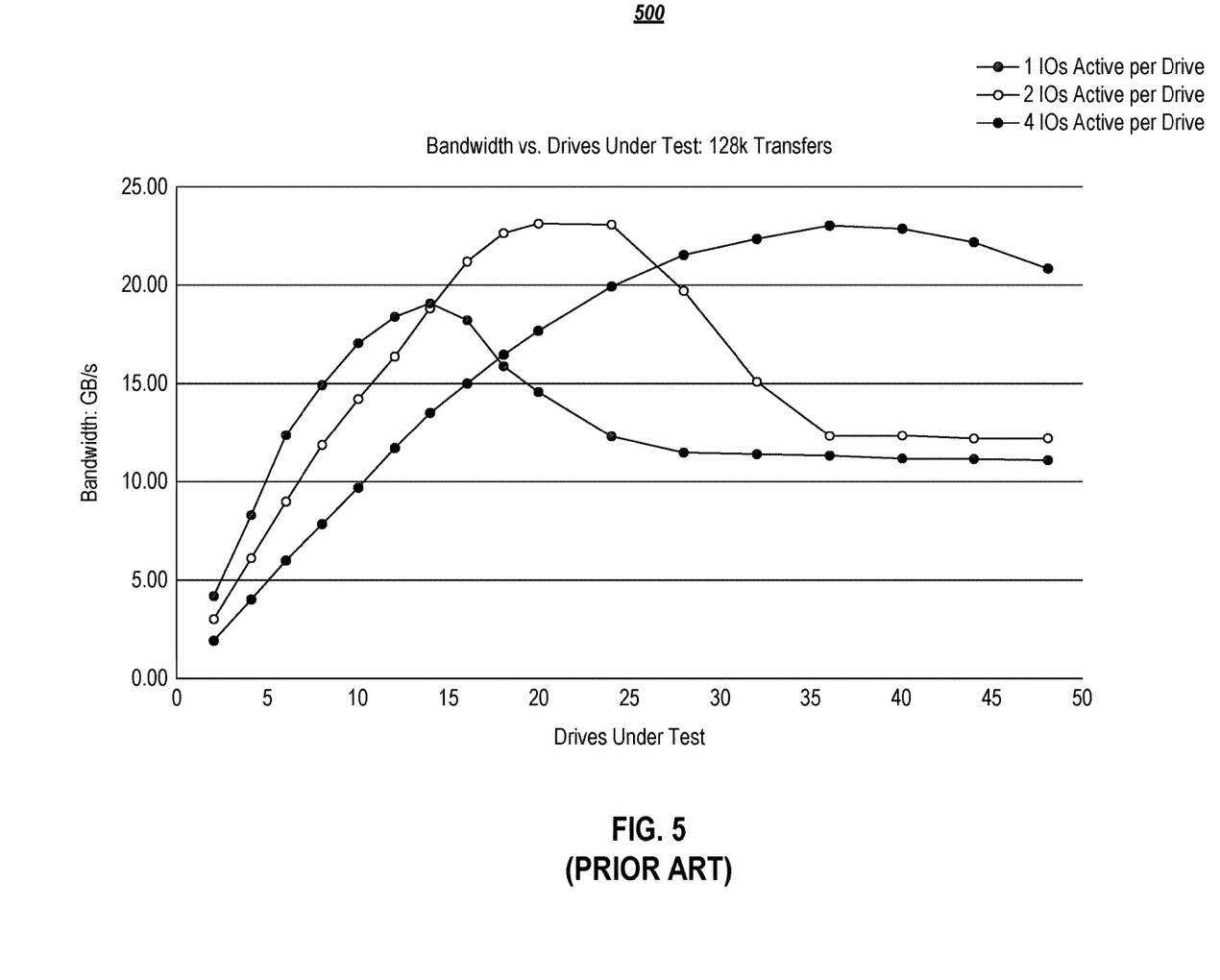
FIG. 5 illustrates the bandwidth scaling challenge in existing designs.

FIG. 5 shows an example of the overall bandwidth measured at an enclosure as a function of the number of SSDs under test in the enclosure environment. Graph 500 comprises three data series, each with an increasing number (one, two, and four) concurrent commands per SSD. In the example in graph 500, all I/O commands are identical, i.e., all are NVMe™ reads having a size of 128 kB. Ideally, the overall bridge bandwidth increases with increasing number of SSDs and saturates at the fabric's maximum bandwidth value. In practice, however, the bridge device scales relatively, as expected, with a single command per SSD; but, as the number of outstanding commands is increased, the bridge momentarily reaches maximum bandwidth and then tails off. As the amount of active data being transferred reaches the cache capacity, each subsequent data access to the bridge memory causes cache evictions and a lower cache hit ratio. As the workload (i.e., the number of drives under test) continues to grow, the overall bandwidth falls to the DDR memory limit instead of to the fabric maximum bandwidth, which causes the data rate to drop off precipitously as a result.

This highlights the tradeoff of using the bridge's cache: on one hand, to increase the performance of individual SSD it is better to increase the number of concurrent IOs, while, on the other hand, as the number of SSDs being accessed increases, oversubscription of the bridge's cache causes the performance to drop.

C. Example Implementations

As defined in the NVMe™ specification, one of the capabilities of an NVMe™ SSD includes advertising its capability of using its controller memory buffer (CMB) for data read and write operations. In one or more embodiments, a CMB implemented in the NVMe™ SSD controller may comprise a read/write memory region that is accessible to a host, e.g., through a PCIe interface, to perform read and write operations. The SSD controller has direct internal access to the address range of the CMB. Various embodiments herein take advantage of the SSD's CMB to modify I/O data flow for an NVMe-oF™ JBOF enclosure in a manner that enhances overall performance of a system comprising an NVMe-oF™ SSD enclosure.

Figure 6:
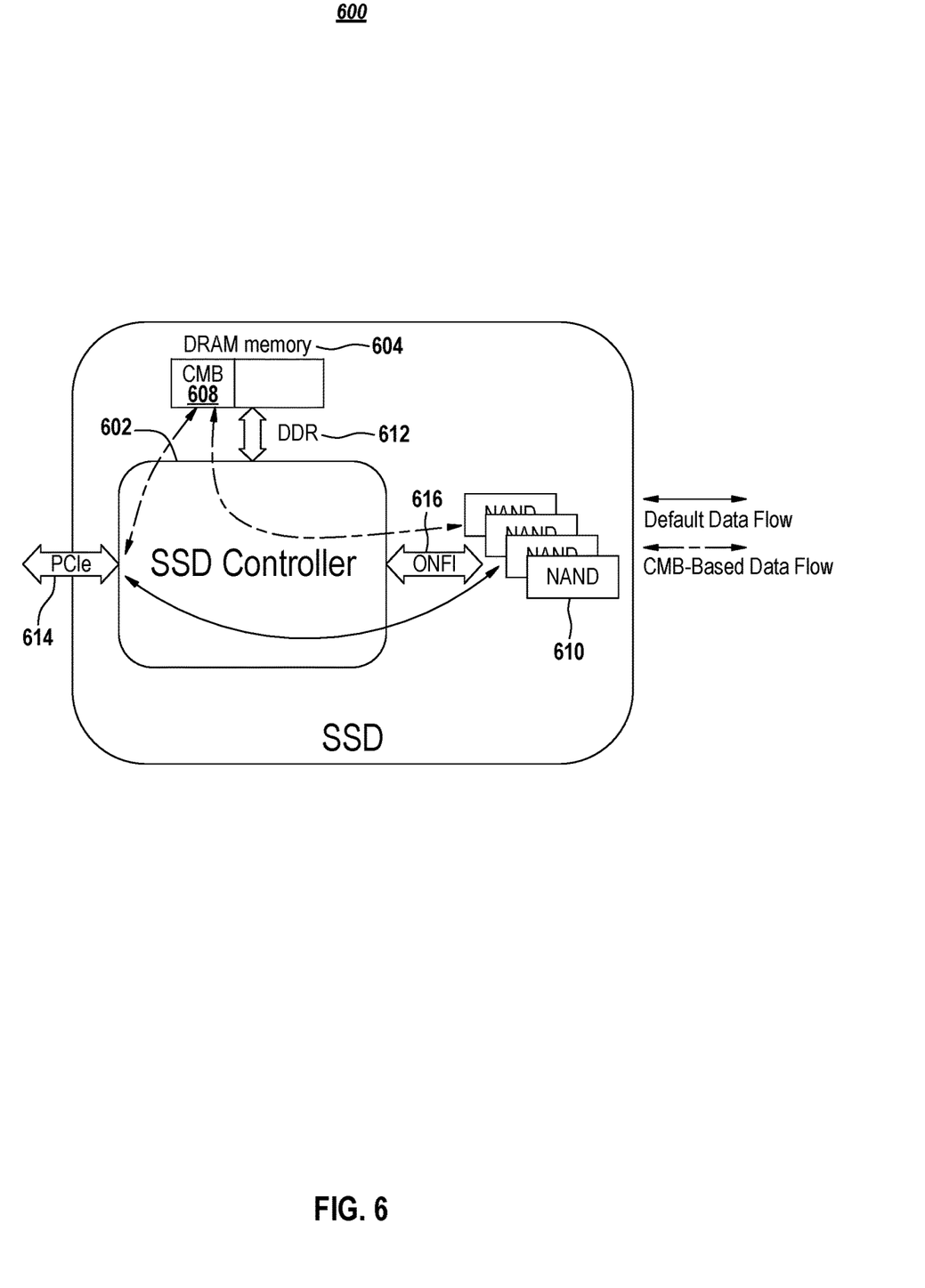
FIG. 6 depicts data flow in an NVMe™ SSD comprising a CMB, according to embodiments of the present disclosure.

FIG. 6 illustrates comparative default read/write and CMB-based data flows within an SSD according to embodiments of the present disclosure. As depicted, SSD 600 may comprise SSD controller 602, NAND flash memory devices 610, and internal direct random access memory (DRAM) 604 that comprises CMB 608.

In operation, SSD controller 602 may communicate with a host over bus 614, e.g., using a Peripheral Component Interconnect Express (PCI Express or PCIe) bus standard. SSD controller 602 may further communicate with DRAM device 604, e.g., over double data rate (DDR) bus 612, and with NAND flash devices 610 over a physical interface 616, here, using an Open NAND Flash Interface Working Group (ONFI) specification. It is understood that any other protocol, standard, or mechanism may be used to facilitate communication between components internal and external to SSD 600, e.g., to manage data processed and stored by such components. Existing default data flow, i.e., non-CMB-enabled data flow, comprises SSD controller 602 using DMA to exchange data with the host memory, internally buffer the data, and write it to non-volatile media, e.g., NAND flash memory 610.

In contrast, in one or more embodiments of the present disclosure, CMB-based data flow 630 that utilizes CMB 608 may comprise, for example, an NVMe™ read operation by which a host may submit a read command to the submission queue of SSD controller 602. In one or more embodiments, e.g., when the bridge programs a DMA engine of a fabric port (not shown in FIG. 6), unlike in existing designs in which a memory data pointer points to the DDR local address, the pointer may point to an address range in CMB 608 as the data is not written to the cache and DDR (shown in FIG. 7) of the bridge. SSD controller 602 may read the data from NAND devices 610 and, instead of sending the data over PCIe bus 614 to a host memory address, SSD controller 602 may write the data to any number of buffers in CMB 608.

In one or more embodiments, once the data is written to CMB 608, SSD controller 602 may communicate to the host that the data has been read and is now available to be read from CMB 608. Unlike the default data flow, once the data has been written to CMB 608, SSD 600 may be viewed as having completed the I/O transfer, even if, subsequent to the transfer, the data is read by the host, e.g., over PCIe bus 614.

Conversely, during an NVMe™ write operation, in one or more embodiments CMB 608 may be used in the following manner: The host I/O data payload may be written to an available CMB 608. A host write command that points the SSD controller 602 to buffer(s) in CMB 608 comprising the I/O data may be sent to the submission queue of SSD controller 602. SSD controller 602 may then read the data from CMB 608 and write it to NAND devices 610. Once the data transfer is complete, SSD controller 602 may send a completion message to the host. Stated differently, unlike the default data flow where host memory is consumed until the SSD 600 reads the data from the NAND devises 610 over PCIe interface 614, in one or more embodiments, the host may directly write data to CMB memory 608 prior to communicating a write command to the submission queue of SSD controller 602.

In this way, various embodiments may utilize the SSD's CMB 608 as the NVMe-oF™ enclosure's read and write data buffer(s), rather than using a bridge's local memory and cache as I/O data traverses I/O paths that bridge the host and NAND devices 610, thereby, avoiding a reduction in bridge memory bandwidth due to the bridge memory becoming congested, as illustrated next.

Figure 7:
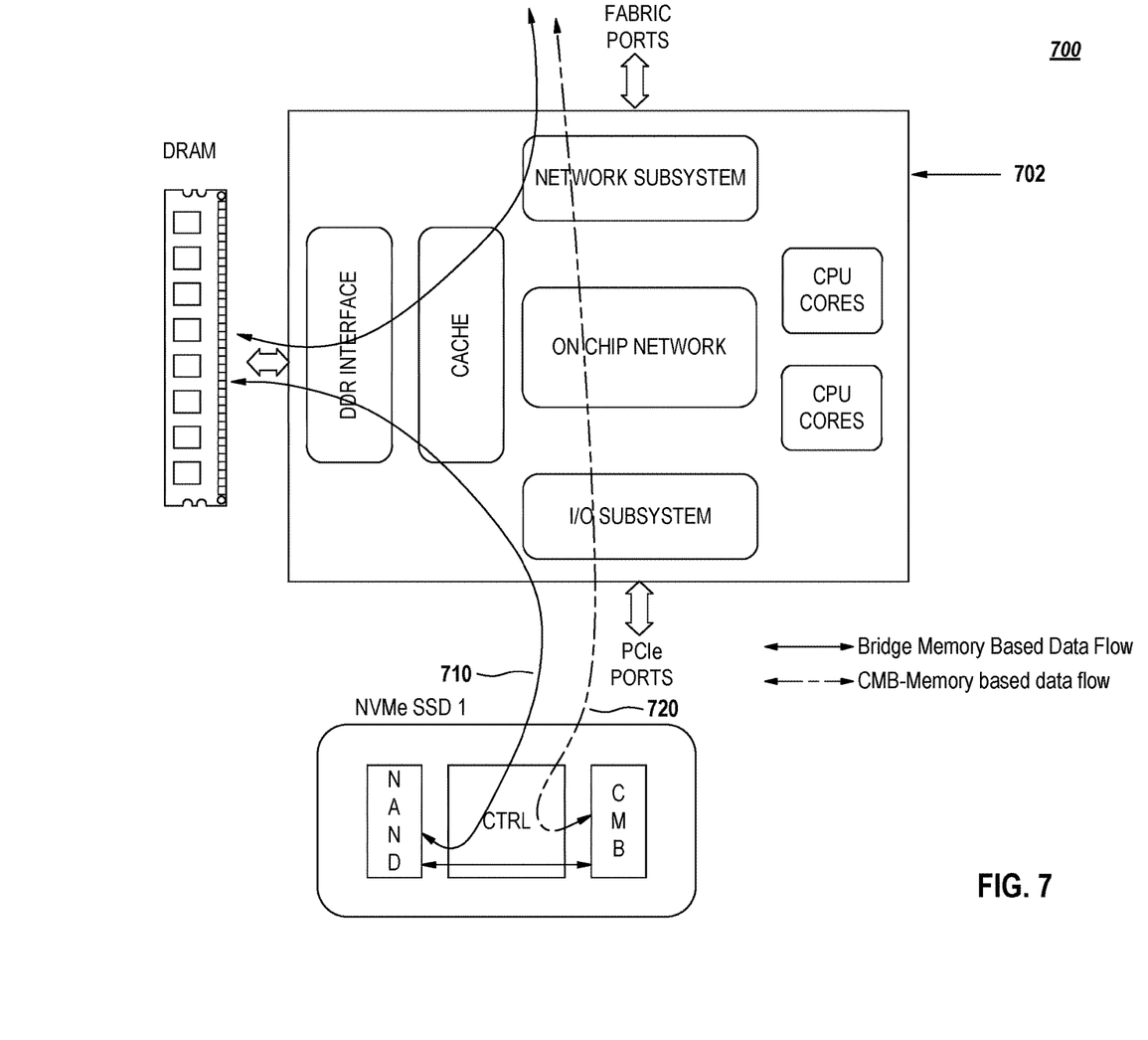
FIG. 7 depicts NVMe-oF™ alternate data flow, according to embodiments of the present disclosure.

FIG. 7 is a block diagram that shows comparative default and CMB-based data flows within of an exemplary NVMe-oF™ bridge device coupled to an NVMe™ SSD in an NVMe-oF™ JBOF enclosure, according to embodiments of the present disclosure, which are unlike the traditional data flow of the I/O payload in path 710 in diagram 700, where I/O data must flow both in and out of the L3 cache (and DDR) for each data move, thereby, increasing power consumption and requiring that memory capacity be allocated to the NVMe-oF™ bridge's cache and memory subsystem to accommodate the worst-case network performance demands, wasting valuable computing resources.

In contrast, as illustrated by I/O path 720 in FIG. 7, in one or more embodiments, SSD 600 and NVMe-oF™ bridge 702 may utilize internal CMB memory 608 of SSD 600 for passing I/O data between a host and NAND devices 610, thereby, successfully avoiding the need to allocate memory capacity and/or bandwidth to bridge memory in NVMe-oF™ bridge 702.

Utilizing NVMe™ CMB 608 in an NVMe-oF™ environment according to various embodiments of the present disclosure has numerous additional advantages over the traditional data flow through bridge memory. Exemplary benefits include that CMB memory 608 may be used to distribute memory bandwidth across any number of SSDs (e.g., SSD 600) in enclosure 700 rather than data buffers being exchanged through the bridge memory subsystem. In contrast, the traditional use of bridge device memory forces a tradeoff between either designing bridge memory bandwidth for the worst-case scenario to meet the full fabric bandwidth, or lowering the bridge memory bandwidth capability at the expense of lowering the JBOF's overall performance.

Further, in one or more embodiments, CMB 608 enables a scalable memory buffer allocation. JBOFs often populate a variable number of SSDs 600, e.g., starting with a subset of slots being populated. In SSDs that comprise CMB memory 608, adding SSDs to a JBOF system adds both memory capacity and memory bandwidth to the system, thus, allowing for a higher bridge memory utilization. Furthermore, using CMB path 720 advantageously does not incur additional copying operations. For example, using CMB 608 as an alternate store-and-forward buffer location, in one or more embodiments, allows to maintain the same number of data copy operations. In contrast, the use of a common NVMe-oF™-to-NVMe™ bridge necessitates using bridge memory as a store-and-forward buffer, unless NVMe™ SSDs are plugged directly into a remote client as those SSDs can directly access the client memory.

As an NVMe-oF™ bridge typically includes some generic processor capabilities that may be used for data services in the JBOF, such as data compression, encryption, hashing, etc. In one or more embodiments, using the CMB path for data buffers allows the bridge memory and cache to be utilized for applications that require such memory access, thus, advantageously freeing up NVMe-oF™ bridge memory. In addition, NVMe-oF™ bridge operations do not reduce the amount of memory that is available for NVM data operations.

Another benefit is that CMB usage has no significant added cost. The implementation of CMB 608 in NVMe™ SSD 600 does not imply the addition of physical memory. SSDs typically include some amount of DRAM capacity for various purposes of SSD operation, e.g., DDR is used to store the SSD flash translation layer (FTL). In one or more embodiments, CMB 608 may have a capacity that is one or more orders smaller than the capacity of DRAM 604

Figure 8:
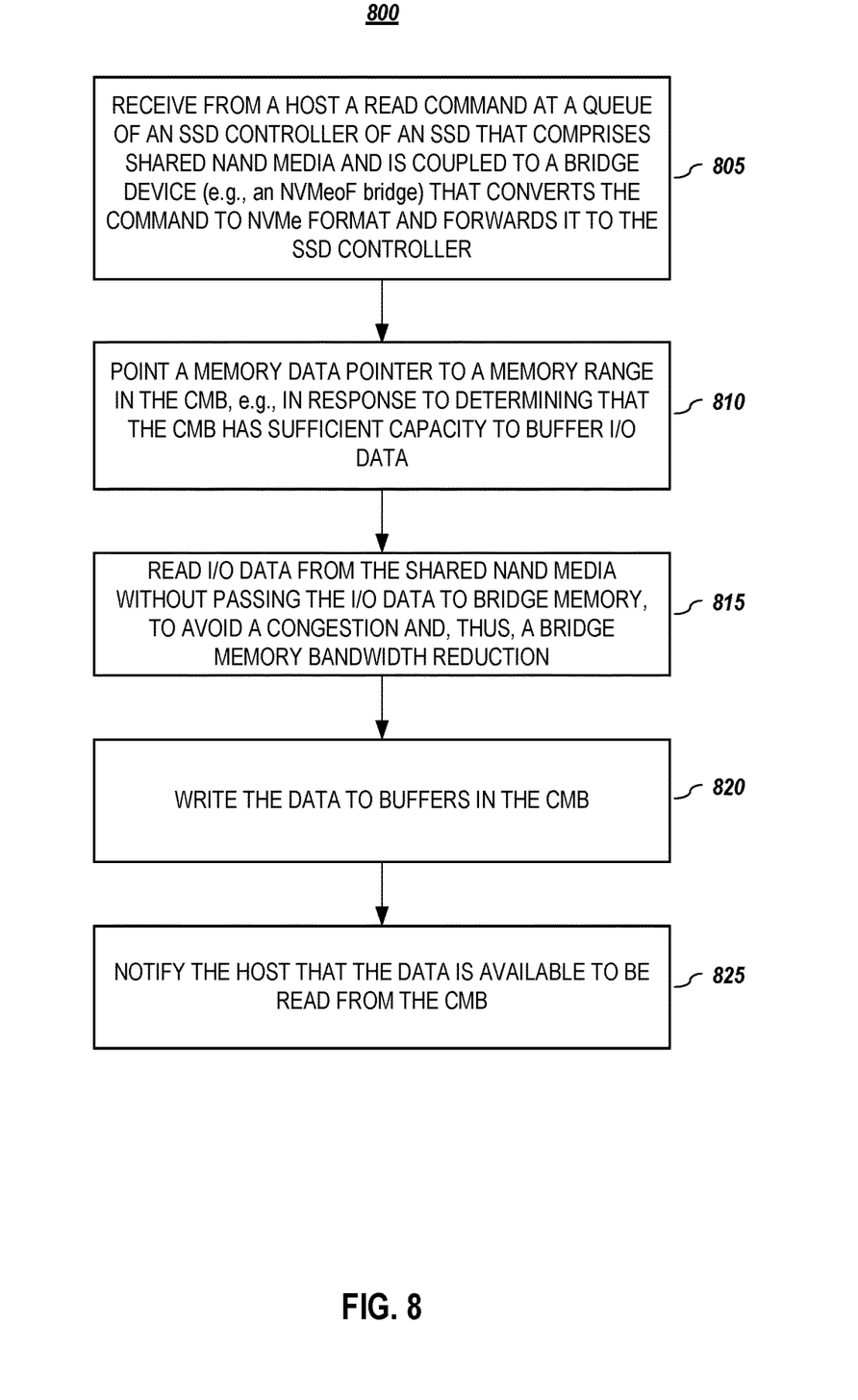
FIG. 8 is a flowchart illustrating a CMB-based NVMe™ read process for improving NVMe-oF™ SSD enclosure performance, according to embodiments of the present disclosure.

FIG. 8 is a flowchart illustrating a CMB-based NVMe™ read process for improving NVMe-oF™ SSD enclosure performance, according to embodiments of the present disclosure. In one or more embodiments, read process 800 may begin when, e.g., in a data transfer phase, a host submits (805) to the submission queue of an SSD controller a read command to read I/O data from a shared non-volatile memory, such as shared NAND media. In one or more embodiments, the host may send the read command to a bridge device, such as an NVMe-oF™ bridge that comprises the SSD controller in an SSD. The NVMe-oF™ bridge may receive the command at a fabric port and translate it to an NVMe™ format prior to communicating the command, e.g., at a PCIe port, to the SSD controller. A memory data pointer may point (810) to a memory range in the CMB, e.g., after determining that the CMB has sufficient capacity to buffer I/O data. In one or more embodiments, the SSD controller may read (815) I/O data from the NAND media without first writing I/O data to a host memory address, passing the I/O data to bridge memory devices in a network bridge, or using bridge memory in a network bridge as a store-and-forward buffer, thereby, saving valuable computing resources, e.g., by avoiding a reduction in bridge memory bandwidth due to the bridge memory becoming congested. The SSD controller may write (820) the data to any number of buffers in the CMB. Once the data is written, the SSD controller may communicate (825) a message to the host to notify the host that the data is available to be read from the CMB.

It shall be noted that: (1) certain steps may optionally be performed; (2) steps may not be limited to the specific order set forth herein; (3) certain steps may be performed in different orders; and (4) certain steps may be done concurrently.

Figure 9:
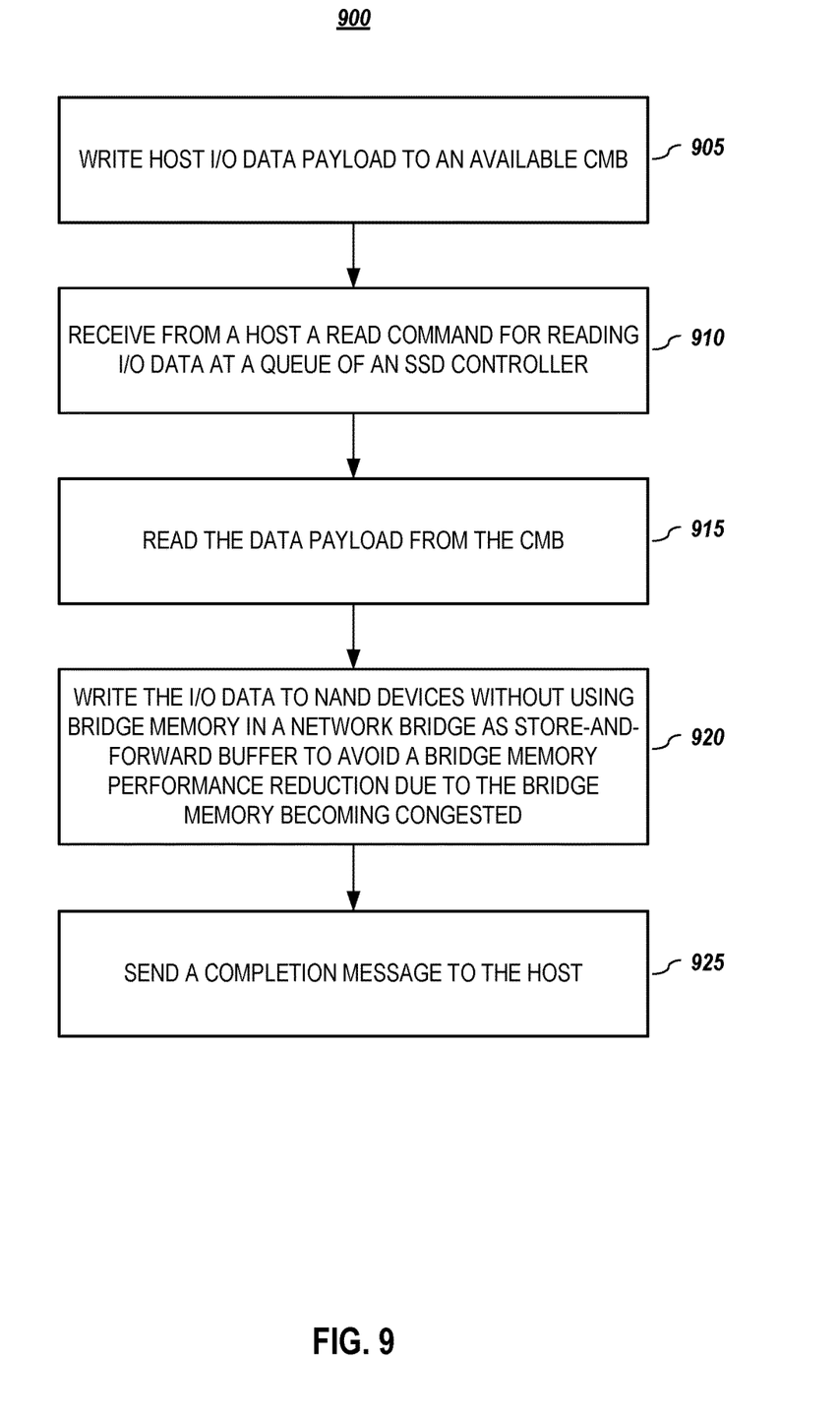
FIG. 9 is a flowchart illustrating a CMB-based NVMe™ write process for improving NVMe-oF™ SSD enclosure performance, according to embodiments of the present disclosure.

FIG. 9 is a flowchart illustrating a CMB-based NVMe™ write process for improving NVMe-oF™ SSD enclosure performance, according to embodiments of the present disclosure. In one or more embodiments, write process 900 may begin when a host I/O data payload is written (905) to an available CMB. A host may send (910) a write command to the submission queue of an SSD controller. In one or more embodiments, the command may point the SSD controller to the CMB that comprises the data. The SSD controller may read (915) the data payload from the CMB and write (920) the data to any number of NAND devices without using a bridge memory in a network bridge as a store-and-forward buffer, thereby, avoiding a reduction in bridge memory performance due to the bridge memory becoming congested. Finally, once the data transfer is complete, the SSD controller may send (925) a completion message to the host.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 10:
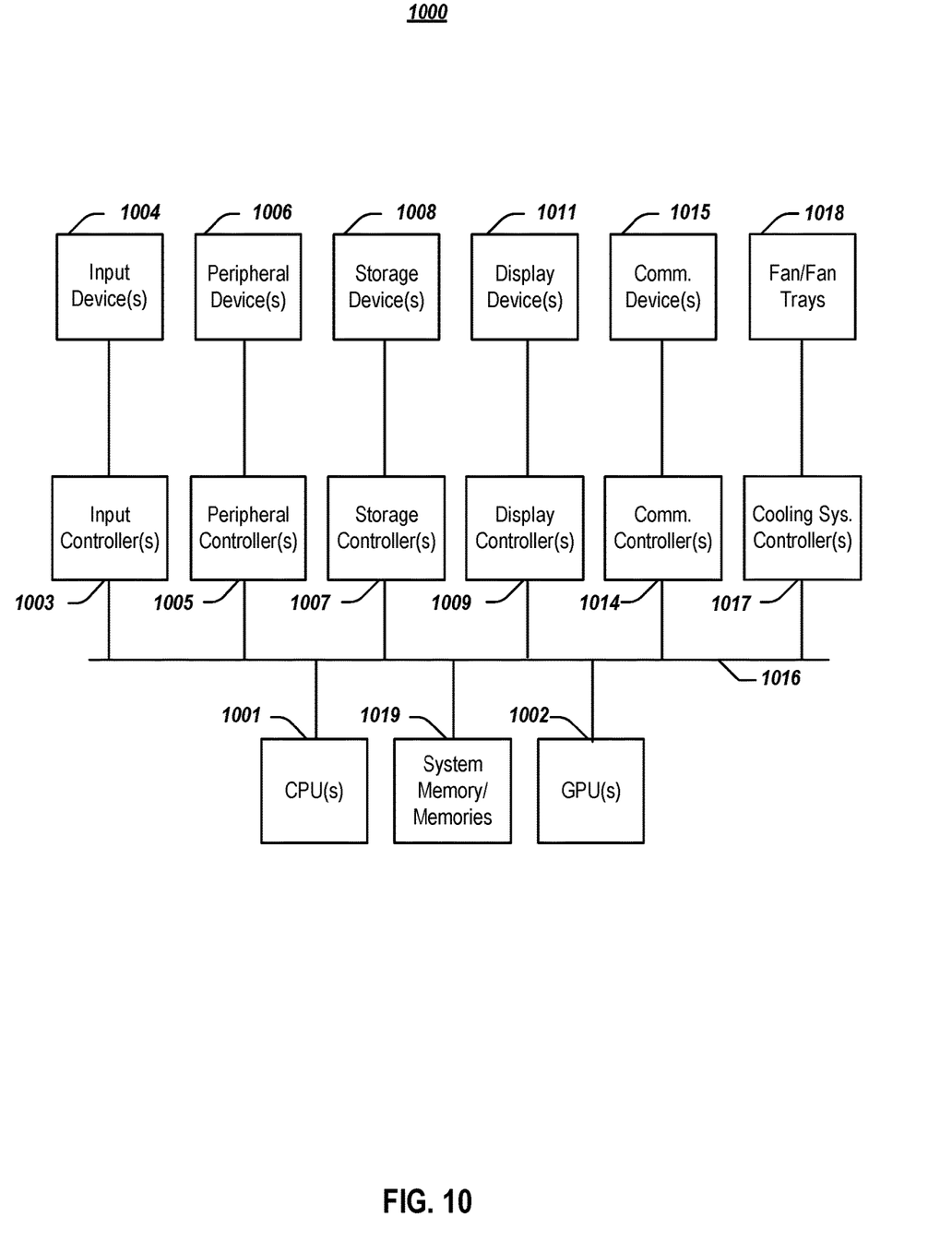
FIG. 10 depicts a simplified block diagram of an information handling system, according to embodiments of the present disclosure.

FIG. 10 depicts a simplified block diagram of an information handling system (or computing system), according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more CPUs 1001 that provide computing resources and control the computer. CPU 1001 may be implemented with a microprocessor or the like and may also include one or more graphics processing units (GPU) 1002 and/or a floating-point coprocessor for mathematical computations. In one or more embodiments, one or more GPUs 1002 may be incorporated within the display controller 1009, such as part of a graphics card or cards. The system 1000 may also include a system memory 1019, which may comprise RAM, ROM, or both.

A number of controllers and peripheral devices may also be provided, as shown in FIG. 10. An input controller 1003 represents an interface to various input device(s) 1004, such as a keyboard, mouse, touchscreen, stylus, microphone, camera, trackpad, display, etc. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT) display, a thin film transistor (TFT) display, organic light-emitting diode, electroluminescent panel, plasma panel, or any other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1000 comprises one or more fans or fan trays 1018 and a cooling subsystem controller or controllers 1017 that monitors thermal temperature(s) of the system 1000 (or components thereof) and operates the fans/fan trays 1018 to help regulate the temperature.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for improving Non-Volatile Memory Express (NVMe™) Over Fabric (NVMe-oF™) Solid-State Drive (SSD) enclosure performance, the method comprising:
   at a first interface, receiving from a host, according to a first network protocol, a read command to read input/output (I/O) data from a shared non-volatile memory;
   converting the read command to obtain a converted read command that is compatible with a second network protocol; and
   at a second interface, communicating the converted read command to a submission queue of an SSD controller, the SSD controller being implemented in an SSD and performing steps comprising:

in response to determining that a volatile memory in the SSD comprises capacity to buffer the I/O data, using a memory data pointer to allocate a memory range in the volatile memory;

reading the I/O data from the shared non-volatile memory without passing the I/O data to one or more bridge memory devices in a network bridge thereby avoiding a reduction in bridge memory bandwidth;

writing the I/O data to the volatile memory; and communicating to the host that the I/O data is available to be read from the volatile memory.

2. The computer-implemented method of claim 1 wherein volatile memory comprises a controller memory buffer (CMB).

3. The computer-implemented method of claim 2 wherein the CMB serves as a store-and-forward buffer that increases a store-and-forward buffer capacity of the NVMe-oF™ SSD enclosure.

4. The computer-implemented method of claim 1 wherein the first network protocol is an NVMe-oF™ protocol, and the second network protocol is an NVMe™ protocol.

5. The computer-implemented method of claim 1 wherein the first interface is a fabric interface, and the second interface is a Peripheral Component Interconnect Express interface.

6. The computer-implemented method of claim 1 further comprising distributing memory bandwidth across volatile memory of two or more SSDs to increase memory bandwidth of the NVMe-oF™ SSD enclosure.

7. The computer-implemented method of claim 1 wherein using the volatile memory of each of a number of SSDs increases a memory utilization of the network bridge.

8. A computer-implemented method for improving Non-Volatile Memory Express (NVMe™) Over Fabric (NVMe-oF™) Solid-State Drive (SSD) enclosure performance, the method comprising:

at a first interface, receiving from a host, according to a first network protocol, a write command to write input/output (I/O) data to a shared non-volatile memory;

converting the write command to obtain a converted write command that is compatible with a second network protocol; and at a second interface, communicating the converted write command to a submission queue of an SSD controller, the SSD controller being implemented in an SSD and performing steps comprising:

reading the I/O data from the volatile memory;

writing the I/O data to the shared non-volatile memory without using bridge memory in a network bridge as store-and-forward buffer thereby avoiding a bridge memory performance reduction due to the bridge memory becoming congested; and communicating to the host that the I/O data has been written to the shared non-volatile memory.

9. The computer-implemented method of claim 8 further comprising using volatile memory of two or more SSDs to increase at least one of a bridge memory bandwidth and a store-and-forward buffer capacity of the NVMe-oF™ SSD enclosure.

10. The computer-implemented method of claim 8 wherein volatile memory comprises a controller memory buffer (CMB).

11. The computer-implemented method of claim 10 wherein the first network protocol is an NVMe-oF™ protocol, and the second network protocol is an NVMe™ protocol.

12. The computer-implemented method of claim 11 wherein CMB is used to perform one or more NVMe™ bridge operations.

13. The computer-implemented method of claim 8 wherein using the volatile memory of each of a number of SSDs increases a memory utilization of the network bridge.

14. An information handling system comprising:

a Solid-State Drive (SSD) enclosure comprising:

a first interface that couples to a host to receive, according to a first network protocol, a read command to read input/output (I/O) data from a shared non-volatile memory;

a conversion module that converts the read command into a converted read command that is compatible with a second network protocol;

one or more bridge memory devices; and a second interface that couples to an SSD that comprises an SSD controller and volatile memory the SSD controller configured to perform steps comprising:

at a submission queue, receiving the converted read command;

in response to determining that the volatile memory comprises capacity to buffer the I/O data, using a memory data pointer to allocate a memory range in the volatile memory;

reading the I/O data from the shared non-volatile memory, without passing the I/O data to the one or more bridge memory devices thereby avoiding a reduction in bridge memory bandwidth;

writing the I/O data to the volatile memory; and communicating to the host that the I/O data is available to be read from the volatile memory.

15. The information handling system of claim 14 wherein volatile memory comprises a controller memory buffer (CMB).

16. The information handling system of claim 14 wherein the CMB serves as a store-and-forward buffer that increases a store-and-forward buffer capacity of the SSD enclosure.

17. The information handling system of claim 14 wherein the first network protocol is an Non-Volatile Memory Express™ over Fabrics (NVMe-oF™) protocol, and the second network protocol is an NVMe™ protocol.

18. The information handling system of claim 14 wherein the first interface is a fabric interface, and the second interface is a Peripheral Component Interconnect Express interface.

19. The information handling system of claim 14 further comprising using volatile memory of two or more SSDs to increase the bridge memory bandwidth.

20. The information handling system of claim 14 wherein using the volatile memory of each of a number of SSDs increases a memory utilization of at least one of the one or more bridge memory devices.

* * * * *